United States Patent [19]

Harding et al.

[11] Patent Number: 4,974,798
[45] Date of Patent: Dec. 4, 1990

[54] VEHICLE WIRING HARNESS CABLE MOUNTING ASSEMBLY STRUCTURE

[75] Inventors: Donald R. Harding, New Hudson; Martin D. Smith, Troy, both of Mich.

[73] Assignee: Chrysler Corporation, Highland Park, Mich.

[21] Appl. No.: 451,702

[22] Filed: Dec. 18, 1989

[51] Int. Cl.⁵ .............................................. H02G 3/02
[52] U.S. Cl. .................................... 248/73; 248/221.4; 248/224.3; 174/72 A
[58] Field of Search ............ 248/74.3, 71, 74.5, 248/67.7, 74.2, 221.4, 73, 224.3; 174/72 A; 24/625, 615, 304, DIG. 11

[56] References Cited

U.S. PATENT DOCUMENTS

| | | | |
|---|---|---|---|
| 2,931,851 | 4/1960 | Sims | 248/71 |
| 3,210,030 | 10/1965 | Ramsey et al. | 248/71 |
| 3,434,297 | 7/1969 | Geisinger | 248/74.3 X |
| 4,811,922 | 3/1989 | Yoneyama | 474/72 A X |
| 4,856,739 | 8/1989 | Takikawa | 248/74.3 X |

FOREIGN PATENT DOCUMENTS 1568221  5/1980  United Kingdom ............... 248/74.3

Primary Examiner—Alvin C. Chin-Shue
Attorney, Agent, or Firm—Edward A. Craig

[57] ABSTRACT

A vehicle wiring harness cable mounting assembly structure is provided. The structure includes a substantially T-shaped clip which has an elongated cable retainer portion. A latching prong extends from a central point of the elongated cable retainer portion to define therewith the T-shape. A wiring harness cable lies along the length of the elongated cable retainer portion. Securement means fasten the wiring harness cable to the elongated cable retainer portion on each side of the latching prong. A latch receptacle is secured to vehicle structure. The latching prong has a free end portion remote from the elongated cable retainer portion. The free end portion includes latching structure for releasable engagement with the latch receptacle.

7 Claims, 1 Drawing Sheet

U.S. Patent
Dec. 4, 1990
4,974,798
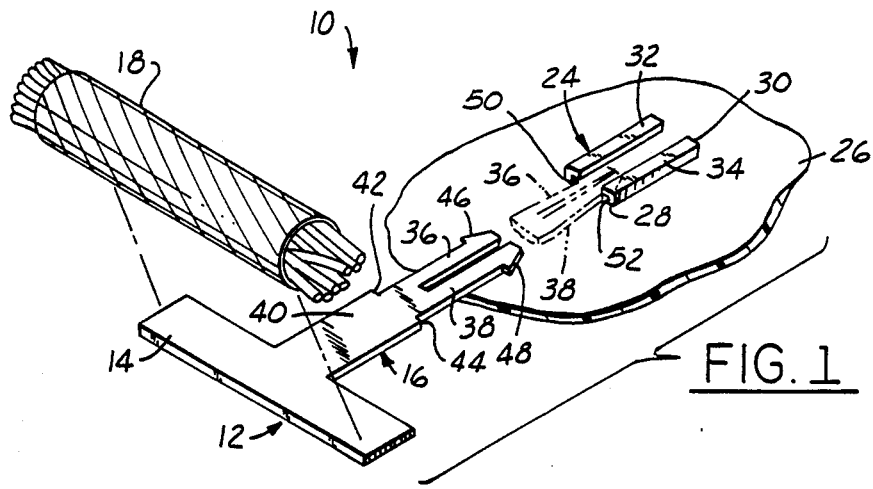
FIG. 1
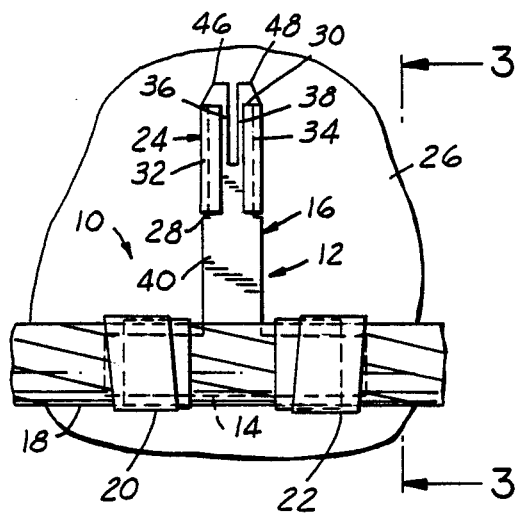
FIG. 2
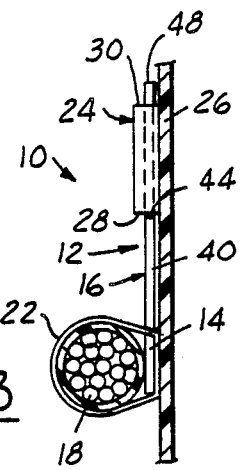
FIG. 3
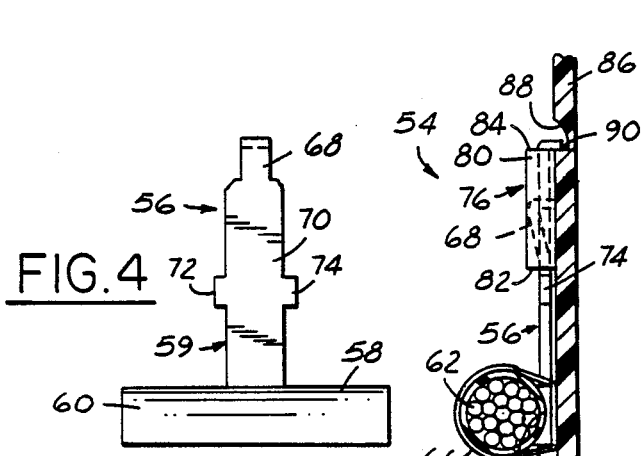
FIG. 4
FIG. 6
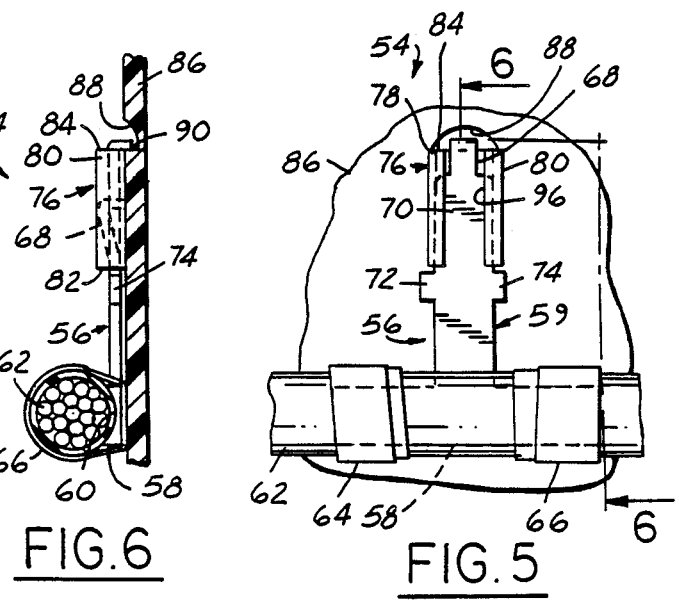
FIG. 5

VEHICLE WIRING HARNESS CABLE MOUNTING ASSEMBLY STRUCTURE

BACKGROUND OF THE INVENTION

1. Field of Art:

The present invention relates to structure for mounting a vehicle wire harness cable assembly which includes a T-shaped clip securable to a latch receptacle.

2. Prior Art:

The present invention was developed in response to a problem encountered with the door wiring harnesses used in modern cars. Current wiring harnesses can be quite heavy. When such harnesses are mounted only by use of switch or component connections, problems may occur during shipment and assembly. Stresses on the connections imposed by the wire harnesses weight can lead to problems such as cracked insulators and switches, broken wires, and pulled out terminals. The present invention was developed as a means of efficiently transferring the weight of the wiring harnesses directly to vehicle structural panels thereby eliminating these problems.

Previously, wiring harnesses have been mounted by use of clips which utilize a Christmas-tree type connector which fits within pre-punched sheet metal holes. A Christmas-tree connector consists of a cylindrical element which has a plurality of spiny projections. When it is inserted into a hole, the spiny projections catch and lock the connector to the sheet metal.

However, cars vary in the number of optional accessories included therein which varies the number of wiring harnesses and branches required. A car with few optional accessories will have less wiring and therefore require less connectors. As a result, a number of pre-punched sheet metal holes will not be plugged with the connector on such a car. These open holes provide an avenue for noise transfer to the passenger compartment. The present invention eliminates the need for pre-punching holes by eliminating the need for the Christmas-tree type fasteners. It also provides a clip construction which will fit different diameter harness cable and which may be removed for service without being destroyed.

SUMMARY OF THE INVENTION

A vehicle wiring harness cable mounting assembly structure is provided. The structure includes a substantially T-shaped clip including an elongated cable retainer portion. A latching prong extends from a central point of the elongated cable retainer portion to define therewith the T-shape. A wiring harness cable lies along the length of the elongated cable retaining portion. Securement means fasten the wiring harness cable to the elongated cable retaining portion on each side of the latching prong. A latch receptacle is secured to vehicle structure. The latching prong has a free end portion remote from the elongated cable retaining portion. The free end portion includes latching structure for releasable engagement with the latch receptacle.

The elongated cable retaining portion may be substantially flat and rectangular or may include a concave groove extending for the length thereof to receive a portion of a cylindrical cable. The cable is preferably secured in place by means of adhesive tape.

The latching prong desirably has a substantially flat elongated rectangular configuration. The latch receptacle may be in the form of a hollow box-like configuration with opposed open ends and with the interior of the latch receptacle being configured to relatively tightly received at least portions of the latching prong. The latching prong is received in one of the open ends and extends beyond the other open end.

The latching structure comprises at least one tang at the free end of the latching prong. This tang is engagable with the latch receptacle. The tang structure may be fashioned as two spaced apart flexible legs, each terminating in a free end portion having a tang thereon which projects away from the other tang laterally outwardly from the legs. These tangs will contact inner surfaces of the hollow box-like latch receptacle upon insertion thereinto causing the legs to flex towards each other. The tangs pass beyond the other open end upon complete insertion of the latching prong into the latch receptacle with subsequent flexing of the legs back to their original positions whereupon the tangs engage the other end of the latch receptacle.

Alternately, the free end portion of the latching prong may be defined by a flat, flexible leg of less width than the remainder of the latching prong. A tang is provided on the free end of this flexible leg and projects at right angles to the plane of the leg. The tang contacts inner surface portions of the hollow box-like latch receptacle upon insertion thereinto causing the leg to flex away. The latch receptacle has a slot therein of greater width than the width of the leg permitting the leg to flex thereinto. The tang passes beyond the other open end upon complete insertion of the latching prong into the latch receptacle with subsequent flexing of the leg back to its original position whereupon the tang engages the other end of the latch receptacle.

Preferably, the vehicle structure is formed of plastic material with the latch receptacle being formed integrally therewith. In the case of the second above-mentioned latching prong structure, a depression is formed in the vehicle structure defining a shelf which is engaged by the tang.

IN THE DRAWINGS:

FIG. 1 is a view in perspective of one embodiment of the vehicle wiring harness cable mounting assembly structure of the present invention illustrating the parts prior to assembly thereof;

FIG. 2 is an elevational view of the embodiment illustrated in FIG. 1 shown fully assembled;

FIG. 3 is a sectional view taken substantially along the line 3—of FIG. 2 looking in the direction of the arrows;

FIG. 4 is an elevational view of another embodiment of the clip used in the assembly structure;

FIG. 5 is an elevational view showing the fully assembled assembly structure using the clip of FIG. 4; and FIG. 6 is a sectional view taken substantially along the line 6—6 of FIG. 5 looking in the direction of the arrows.

DESCRIPTION OF PREFERRED EMBODIMENTS

Referring to FIGS. 1-3, it will be noted that the vehicle wiring harness cable mounting assembly structure 10 includes a substantially T-shaped clip 12 which includes an elongated cable retainer portion 14. A latching prong 16 extends from a central point of the elongated cable retainer portion 14 to define therewith the T-shape. The elongated cable retainer portion 14 receives a wiring harness cable 18 which lies along the length thereof. As will be appreciated, only a portion of the wiring harness is illustrated. Vehicle wiring harnesses include main cable portions from which branches extend. The function of wiring harnesses is to interconnect the various electrical devices of a vehicle as necessary. Wiring harnesses are pre-assembled at a remote location and then shipped to a sub-assembly location wherein they are integrated with a larger component which, in turn, is used in a vehicle assembly plant for the final assembly of a vehicle. Wiring harnesses frequently are somewhat heavy and it is desirable to fasten them along their length to vehicle structure to remove stress from the various connectors, switches and the like and also to rationalize the position of the wiring harness within the vehicle.

Securement means fasten the wire harness cable 18 to the elongated cable retainer portion 14 as illustrated in FIGS. 2 and 3. The securement means are illustrated as lengths of adhesive tape, which are wrapped around both the cable 18 and retainer portion 14, a tape section 20 being provided on one side of the latching prong 16 and a tape section 22 being provided on the other side of the latching prong 16. The use of a securement means on each side of the latching prong 16 firmly secures the cable in place and results in the cable exerting a substantially straight line force on the latching prong 16 which is desirable to prevent canting of the latching prong. Securement other than by adhesive tape may be used as desired, such, for example, as clips or the like. The use of adhesive tape has been found to be effective both from a functional standpoint and assembly standpoint. The adhesive tape may be any of those commonly used in connection with electrical wiring.

A latch receptacle 24 is secured to vehicle structure 26. The structure 26 is preferably a molded plastic panel fabricated of, for example, ABS plastic. Preferably, the latch receptacle 24 is formed integrally as part of the vehicle structure panel 26. This panel may be, for example, a portion of a door assembly.

The latch receptacle 24 has a hollow box-like configuration with opposed open ends 28, 30. L-shaped wall sections 32, 34 form, with the adjacent surface of the panel 26, the box-shape.

The latching prong 16 has a free end portion remote from the elongated cable retainer portion 14, the free end portion including latching structure for releasable engagement with the latch receptacle. As will be noted, the latching prong 16 includes two spaced apart legs 36, 38. The clip 12 is preferably fabricated of a tough but flexible plastic material such as nylon so that the legs 36, 38 will be flexible. The legs 36, 38 extend from a portion 40 which is wider than the width of the leg structure to thereby define shoulders 42, 44 which limit the degree of insertion of the latching prong into the space between the L-shaped wall sections of the latch receptacle 24. The portion 40 extends from the elongated cable retainer portion 14 which, as will be noted, is substantially flat and rectangular. Triangularly shaped tangs 46, 48 are provided on the free ends of the legs. The tangs 46, 48 project away from each other laterally, outwardly from the legs 36, 38 as shown in FIGS. 1 and 2.

After the cable 18 is secured to the retainer portion 14, the latching prong 16 may be inserted into the latch receptacle 24. Upon initial insertion of legs 36, 38 into the latch receptacle, the tangs 46, 48 contact inner surfaces 50, 52 of the latch receptacle causing the legs 36, 38 to flex towards each other as shown in dotted lines in FIG. 1. Upon complete insertion of the latching prong 16 into the latch receptacle 24 (which occurs when the shoulders 42, 44 abut against the lower end 28 of the latch receptacle), the tangs 46, 48 pass beyond the other open end 30 of the latch receptacle with subsequent flexing of the legs 36, 38 back to their original positions whereupon the tangs 46, 48 will engage the end 30 of the latch receptacle as shown in FIGS. 2 and 3. This engagement is releasable to permit removal of the wiring harness for service purposes. It is only necessary to manually flex the legs 36, 38 together by compressing the tangs 46, 48 whereupon the clip 12 may be withdrawn from the latch receptacle 24. After the latching prong 16 is inserted into the latch receptacle 24, with the tangs engaging the latch receptacle, the legs 36, 38 flex back to their original width as above mentioned into relatively tight contact with the inner surfaces 50, 52 of the latch receptacle to thereby prevent jiggling or vibratory motion.

FIGS. 4-6 illustrate another embodiment of the invention. The vehicle wiring harness cable mounting assembly structure 54 therein shown includes a clip 56, preferably fabricated of plastic material as previously described. The clip 56 has an elongated cable retainer portion 58 and a latching prong 59 defining a T-shape as previously described.

The elongated cable retainer portion differs in that it is not a substantially flat element but is provided with a concave groove 60 extending for the length thereof. The wiring harness cable 62 is cylindrical with a portion thereof received in the concave groove as shown in FIG. 6. This arrangement provides a somewhat more secure mounting for the cable. The cable is retained in place by means of adhesive tape sections 64, 66 as previously described.

The latching prong 59 has a single flat flexible leg 68. This leg is of less width than the remaining portion 70 of the latching prong. A pair of shoulders 72, 74 are provided on portion 70 to limit insertion of the latching prong into a latch receptacle 76 as previously described.

The latch receptacle 76 has a hollow box-like configuration defined by L-shaped wall sections 78, 80 with opposed open ends 82, 84. The latch receptacle 76 is formed integrally with a molded plastic vehicle structure panel 86 with the panel 86 defining part of the latch receptacle. A depression 88 is formed in the panel 86 immediately adjacent to the end 84 of the latch receptacle. The depression 88 defines a shelf 90 for engagement with a clip tang as will be described. The interior of the latch receptacle 76 is configured to relatively tightly receive the portion 70 of the latching prong 59 for the purposes previously mentioned.

A tang 92 is provided on the free end of the leg 68. The tang 92 projects at right angles to the plane of the leg 68 as will be noted in FIG. 6. The tang 92 contacts the surface of the panel 86 upon insertion of the latching prong 59 into the latch receptacle causing the leg 68 to flex away therefrom as shown in dotted lines in FIG. 6. The latch receptacle 76 has an elongated slot 96 therein which is of greater width than the width of the leg 68 thereby permitting the leg 68 to flex away from the panel 86 during insertion of the latching prong 59 into the latch receptacle 76. The tang 92 passes beyond the end 84 of the latch receptacle 76 upon complete insertion of the latching prong 59 into the latch receptacle (which occurs when the shoulders 72, 74 abut against the end 82 of the latch receptacle), with subsequent flexing of the leg 68 back to its original position whereupon the tang 92 engages the shelf 90 to maintain the clip in place. The clip may be removed by manually flexing the tang 92 off the shelf 90.

We claim:

1. A vehicle wiring harness cable mounting assembly structure comprising a substantially T-shaped clip including a substantially flat elongated cable retainer portion, a substantially flat elongated latching prong connected to an outer lnogitudinal edge of said retainer portion and extending from a central point of the elongated cable retainer portion to define therewith the T-shape, the cable retainer portion and latching prong being substantially co-planar, a wiring harness cable lying along the length of the elongated cable retainer portion, securement means fastening the wiring harness cable to the elongated cable retainer portion on each side of the latching prong, a latch receptacle secured to vehicle panel structure, the latch receptacle comprising a pair of spaced apart L-shaped wall sections extending from the vehicle panel structure resulting in a latch receptacle configuration with opposed open ends, the latching prong having a free end portion remote from the elongated cable retainer portion, the interior of the latch receptacle being configured to relatively tightly receive at least portions of the latching prong, the latching prong being received in one of said open ends and extending beyond the other of said open ends, the latching structure comprising at least one tang at the free end portion of the latching prong, the tang being engagable with the latch receptacle.

2. The structure of claim 1 wherein the elongated cable retainer portion includes a concave groove extending for the length thereof, the wiring harness cable being cylindrical with a portion thereof received in the concave groove.

3. The structure of claim 1 wherein said securement means is adhesive tape.

4. The structure of claim 1 wherein the latching prong includes two spaced apart flexible legs each terminating in a free end portion, a tang on the free end of each leg, the tangs projecting away from each other laterally outwardly from the legs, the tangs contacting inner surfaces of the latch receptacle upon insertion thereinto causing the legs to flex towards each other, the tangs passing beyond said other open end upon complete insertion of the latching prong into the latch receptacle with subsequent flexing of the legs back to their original positions whereupon the tangs engage said other end of the latch receptacle.

5. The structure of claim 1 wherein said vehicle panel structure is formed of plastic material, said latch receptacle being formed integrally therewith.

6. The structure of claim 1 wherein the free end portion of the latching prong is defined by a flat flexible leg of less width than the remainder of the latching prong, a tang on the free end of said flexible leg, the tang projecting at right angles to the plane of the flexible leg, the tang contacting inner surface portions of the hollow box-like latch receptacle upon insertion of the latching prong into the latch receptacle causing the leg to flex away therefrom, the latch receptacle having a slot therein of greater width than the width of the leg permitting the leg to flex thereinto, the tang passing beyond said other open end upon complete insertion of the latching prong into the latch receptacle with subsequent flexing of the leg back to its original position whereupon the tang engages said other end of the latch receptacle.

7. The structure of claim 6 wherein said vehicle structure is formed of plastic, said latch receptacle being formed integrally therewith, said other end of the latch structure including a depression in the vehicle structure defining a shelf engagable by the tang.

* * * * *